United States Patent
Cox

(10) Patent No.: US 6,449,350 B1
(45) Date of Patent: *Sep. 10, 2002

(54) PROCESSES AND SYSTEMS FOR DYNAMICALLY MEASURING SWITCH TRAFFIC

(75) Inventor: Stephen Todd Cox, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,101
(22) PCT Filed: Jun. 8, 1998
(86) PCT No.: PCT/US98/11317
§ 371 (c)(1),
(2), (4) Date: Nov. 18, 1999
(87) PCT Pub. No.: WO98/56190
PCT Pub. Date: Dec. 10, 1998

Related U.S. Application Data

(60) Provisional application No. 60/068,206, filed on Dec. 19, 1997.

(51) Int. Cl.$^7$ ............................................... H04M 15/00
(52) U.S. Cl. ............. 379/134; 379/112.03; 379/112.05; 379/112.06; 379/112.1; 379/133
(58) Field of Search ...................... 379/112.03, 112.04, 379/112.05, 112.06, 114.08, 114.09, 115.01, 133–134, 229–230

(56) References Cited

U.S. PATENT DOCUMENTS

| | | | |
|---|---|---|---|
| 4,156,109 A | | 5/1979 | Kraushaar et al. |
| 4,456,788 A | | 6/1984 | Kline et al. |
| 5,042,064 A | * | 8/1991 | Chung et al. |
| 5,159,625 A | | 10/1992 | Zicker |
| 5,333,183 A | | 7/1994 | Herbert |
| 5,359,649 A | | 10/1994 | Rosu et al. |
| 5,410,589 A | | 4/1995 | Galligan |

(List continued on next page.)

FOREIGN PATENT DOCUMENTS

| | | |
|---|---|---|
| DE | 19604084 A1 | 10/1996 |
| EP | 0 426 452 A2 | 5/1991 |
| WO | WO 96/07110 | 3/1996 |

*Primary Examiner*—Duc Nguyen
(74) *Attorney, Agent, or Firm*—Kilpatrick Stockton LLP

(57) ABSTRACT

A process and system is disclosed for determining automatically and dynamically the correct time segment during which a switch or components of a switch receive peak traffic from a communications network. The process collects traffic data regarding the usage of a selected switch or selected switch components. The traffic data is collected over a selected journalling period (e.g., 30 days), which is periodically updated with new traffic data to maintain a journal of the most recent 30 days of collected traffic data. Collected traffic data, is filtered to remove aberrant or corrupting data. An average peak usage segment for all of the segments of the journalling period is selected from the remaining filtered traffic data. By regularly adding new data to and removing old data from the journal, the resulting moving window will reflect recent changes in peak usage. Regularly (e.g., daily) selecting the average peak usage segment detects such changes quickly, with the result that the process of the present invention dynamically reacts to and determines changes in the peak usage segment for particular switch components. Peak usage segments and associated traffic data determined and collected by the present invention result in improved network traffic engineering. A system is disclosed for collecting, processing and evaluating traffic data in order to engineer network elements for optimal traffic flow. Additional methods are disclosed for use by the system in dynamically filtering aberrant data with improved accuracy and in determining average traffic usage limits for particular switch components. The methods of the present invention allow more effective use of expensive network switching resources by providing more accurate determination and more dynamic tracking of switch usage at the component level.

18 Claims, 10 Drawing Sheets

U.S. PATENT DOCUMENTS

| | | |
|---|---|---|
| 5,488,715 A | 1/1996 | Wainwright |
| 5,519,697 A | 5/1996 | Fujita et al. |
| 5,539,815 A | 7/1996 | Samba |
| 5,606,601 A | 2/1997 | Witzman et al. |
| 5,696,902 A | 12/1997 | LeClercq et al. |
| 5,854,834 A | 12/1998 | Gottlieb et al. |
| 5,881,137 A | 3/1999 | Ginzboorg et al. |
| 5,896,445 A | 4/1999 | Kay et al. |
| 5,905,785 A | 5/1999 | Dunn et al. |
| 5,933,481 A | 8/1999 | MacDonald |
| 6,011,838 A * | 1/2000 | Cox |

\* cited by examiner

PROCESSES AND SYSTEMS FOR DYNAMICALLY MEASURING SWITCH TRAFFIC

This application claims the benefit of Provisional application Ser. No. 60/068,206, filed Dec. 19, 1997.

This invention relates to processes and systems for dynamically and automatically measuring traffic across a communication network in order to ensure efficient allocation of network resources.

BACKGROUND OF THE INVENTION

Network traffic management aims to cost-effectively minimize the number of unsuccessful communication attempts caused by network congestion or failure, while also ensuring that expensive network equipment is not over-or-under-used. The ultimate goal is to provide a given grade of service with the least amount of equipment. To do this, one must determine the amount of traffic handled by the network, particularly by switches in the network. Traffic data describes the amount and features of the communications (voice, video or data) traffic-through the network. It is collected to help operators of communication networks determine how efficiently those networks are operating and, if necessary, to plan network reductions, repairs or upgrades.

Traffic data also is helpful to large customers who rent or lease network facilities. The owner of this invention also owns a patent that describes a "Telephone System Adapted to Report to Customers Telephone Facility Traffic Data." That U.S. Pat. No. 5,410,589, which describes the advantages of and procedures for collecting and reporting traffic data, is hereby incorporated in its entirety by this reference.

Two typical ways to engineer switch capacity include extreme value engineering, which engineers switches to accommodate the maximum traffic, or time consistent busy hour engineering, which engineers switches to accommodate the peak traffic during a period that, on average, is most busy. A tension exists, however, between providing quality versus cost-efficient service. Extreme value engineering provides maximum quality at high cost; time consistent busy hour engineering provides a chosen level of quality at a lower cost.

For example, a particular switch component may be servicing 256 lines but be provided with only 64 time slots by which those lines are serviced. (Line units allow the analog subscriber lines to communicate with the digital network). The time slots are less than the number of lines because more than 64 lines are rarely, if ever, in use at once. If, however, 65 lines seek access to communications services from the switch at the same time, the 65th caller is blocked by the switch. Typically, networks are engineered to keep blocking below a certain absolute percentage, such as 7% of attempted calls, and within a certain average percentage, such as 1.5% of attempted calls. By way of example, determining that congestion generated "fast busy" signals for over 2% of communications attempted through a particular switch at selected time periods tells network engineers (a) to expect customer complaints about poor service and (b) that the network may need a repair or an upgrade if the problem persists.

Typically, the enormous volume and types of traffic across network switches allowed collection and analysis of only statistically significant samples of traffic data, rather than collecting and analyzing traffic in real time. Thus, prior methods of analyzing switch traffic use the "average peak usage hour" for the entire switch. Peak usage or busy hour refers to the hour of the day in which traffic across the switch hits a peak. (Although the phrase uses the term "hour," the peak usage can be determined over any time period). The "average" refers to the fact that the average peak usage hour is selected by averaging the traffic across many days and then determining, the hour of the day during which peak usage of the network switch occurs. Generally, the average peak usage hour has been determined once per year by manually analyzing the switch traffic usage. The selected "average peak usage hour" is then used for network traffic engineering for the remainder of the year, with switches engineered to handle the volume and type of traffic that occurs during their average peak usage hour.

For example, commercial systems like the COER system marketed by Lucent Technologies, Inc. (formerly part of AT&T) take traffic data from a particular switch and then organize and report that data to allow engineers manually to determine whether switch limits have been reached. This required that the traffic analysis process involve only a small subset of the available data. Also, the COER system determined busy hour only once a year and only for the whole switch.

Other efforts at traffic monitoring have been made. For instance, U.S. Pat. No. 4,456,788 to Kline, et al. describes a "Telecommunication Trunk Circuit Reporter and Advisor" system and method that analyses trunk circuit data. The Kline, et al. patent mentions determining busy hours, but does not describe doing so on a switch component or continuous basis. U.S. Pat. No. 5,359,649 describes systems for "Congestion Tuning of Telecommunications Networks" that monitor network elements and routes to identify congested routes and repair them or reroute traffic.

These prior processes and systems do not address several problems, however. First, a certain number of switch components are engineered beyond (or below) their capacity. That is because traffic data has been collected only for the average peak usage hour of the entire switch, which means that traffic data for this hour is the only data analyzed in engineering the network. But many switch components will have a different average peak usage hour; the same components may also have levels of traffic significantly different during their actual peak usage hour. This results in overburdened or under used switch components that may fail or be more expensive to operate.

Also, the average peak usage hour normally is determined only once a year. This was fine, in the past, when the relative stability of traffic usage across switches required determination of the average peak usage hour only yearly in order to support traffic engineering. The network equipment and customer assignment procedures used when prior traffic usage processes and systems were developed resulted in relatively homogeneous traffic usage across switch components, which also allowed infrequent selection of an average peak usage hour.

Statistical analysis of traffic data predicts the amount of blocking expected for a given level of switch usage. Two key measurements impact the amount of blocking: the traffic volume handled by the switch and the volatility of the traffic. Volume is typically measured in centume call seconds or "CCS" handled by a switch during an average busy hour determined according to the methods described above. Those methods effectively lower average usage capacity of all switch components to match the worst-performing component of the switch. Volatility refers to the degree of traffic variance from a calculated average. Volatility typically was dealt with by simply discarding traffic data collected for days that were believed to be unrepresentative. For example, in many systems, traffic data for holidays, Saturdays, Sundays and even Fridays was disgarded or ignored when analyzing switch loads. As volatility and capacity increase so does blocking.

Recently, however, numerous changes in technology and the industry have occurred. Those changes have drastically and negatively impacted the effectiveness of current processes in analyzing switching capacities.

For instance, two separate causes have resulted in non-homogenous assignment on switch components. First, subscriber carrier delivery systems have reduced the random spreading of the customer assignment process. Most subscriber carrier systems typically handle about 96 lines each and serve a very small geographic area. Because of this, systems often serve primarily only residential customers or only business customers. For example, new subdivisions-may have all of the residences therein assigned to a new switch component. Thus, a switch component handling customers located in a high-end residential area with many second lines and computer modems may handle significantly more and different traffic than components of the rest of the switch. Customers with different usage characteristics are concentrated on different switch components, leading to wildly different busy hours among the components.

A second reason for increasingly non-homogenous assignment is the practice of reusing previously assigned facilities when service to a new customer at an old location was introduced (e.g., when an old customer moves, the connection to the residence remains and service is simply restored when someone else reoccupies the residence). That significantly reduces labor associated with establishing new service at previously occupied locations, but results in less homogeneous traffic because new customers end up being served in a specific, new switch component.

Finally, there has been a constant and increasing proliferation of high use lines for internet service providers, telecommuting host computer connections, and the like. These new, numerous and high use lines also have increased the traffic load differences between various switch components.

Overall, these changes have reduced the homogeneous nature of the traffic load across switch components. Growing numbers of switch components accordingly have average peak usage hours that are different from the average peak usage hour for the whole switch and other components. Also, not only are the average peak usage hours different among components, but the "peak" traffic handled by a particular component may be significantly different from the "peak" traffic handled by other components or the entire switch. This is especially exacerbated by grouping of new subscribers, who may use newer technologies, onto a single switch component, as described above. Furthermore, many of the weekend and holiday traffic data that was disgarded as unrepresentative actually is or is becoming more representative of overall switch traffic.

Numerous components are accordingly not being engineered for proper traffic load. Further, rapid growth in telecommunications has resulted in dynamically changing average peak usage hours. For example, as businesses increasingly provide internet access for their employees, switch traffic during the previously little used lunch hour has greatly increased as employees make use of a "free" internet connection during lunch breaks. Better methods of filtering or eliminating non-representative traffic measurements are also needed.

In short, there is a need for traffic analysis systems and processes that dynamically respond to changes in average peak usage hour and that take account of actual loads across switch components when analyzing traffic usage. Ultimately, improved busy-hour determination and filtering result in more accurate determination of actual traffic usage on an individual switch component basis, which present processes and systems do not allow. That information is then used to (a) adjust the load on a particular switch or its components or (b) reengineer the network to a more optimal configuration for its actual load.

SUMMARY OF THE INVENTION

The present invention aims to accurately and dynamically determine the traffic capacity of individual switch components in order to provide improved service and to more effectively utilize network switching resources. The invention includes an automated process and system that dynamically and automatically determines the correct peak hour and average usage at that hour (or other time period) for selected components of network elements like a switch. The method involves the steps of periodically collecting and storing segments of traffic data on each switch component over a selected time period; averaging the traffic data of each switch component for each segment across the selected time period; and selecting the peak usage segment. Methods also are disclosed for filtering aberrant or statistically corrupting traffic data from the collected traffic data. Such methods dynamically determine whether particular traffic data is statistically unsuitable. The methods for determining correct average usage and peak hour may be repeated continuously in order to take account of changes in the network load and factor those changes into selection of the peak segment for a particular component. This, in turn, allows the method of the present invention to determine accurately and dynamically the capacity limit for each switch component.

Traffic data describing traffic across the switch component at the selected peak usage segment is collected and analyzed. Depending on the results, the load on the selected component may be adjusted or the network otherwise reconfigured. A system is disclosed that performs these processes automatically.

The dynamic and automatic process and system of the present invention quickly recognizes volatile traffic usage changes that take place in the communications network in order to increase the accuracy of traffic analysis. Using this process should increase service results, increase capital dollar savings, and reduce manpower requirements. For instance, more accurate usage data informs traffic engineers to take proactive measures to prevent new conditions from impacting service. Equipment can be deployed in more correct quantities in order to save capitalization costs. Replacing a manual process with an automatic one will reduce the manpower—and related operational costs—required to perform the analysis.

In one embodiment of the invention, selected switch components generate and buffer traffic data. A collector periodically retrieves that traffic data, which describes use of the component over a selected time segment or period, such as 30 minutes. The collector provides the traffic data to a database and processor. Because the collector and processor can monitor numerous (e.g., hundreds on switches with multiple components, the database is helpful for maintaining the large volume of traffic data needed for selecting each component's average peak segment.

The database contains at least enough traffic data to create a journal describing a representative- period of usage of the component. Generally, the journal should be long enough to minimize the impact of a grouping of higher-than-normal daily average peak usage segments, while short enough to respond to a fundamental change in usage of a particular switch or component. The journal acts like a moving window that analyzes the most recent, adjustable number of daily average peak segments to select the average peak usage segment for the journalling period. If a new day's data is added to the journal, any day earlier than the previous 30 days (or other time frame that comprises the journalling period) can be ignored. Selecting an average peak usage segment from a rolling journalling period prevents a spike in a particular component's busy hour from affecting selection of the average peak usage hour. In any event, collecting a journal full of traffic data ensures sufficient data to allow determination of an average peak usage segment that appropriately reflects average peak traffic across various switches and switch components.

The processor averages collected, filtered traffic data on each switch component for each segment across an entire journalling period. This process repeats until successive segments in a single day have been averaged with the corresponding 29 (for a 30 day journal) other segments. This determines the average usage of the component during each time segment. The result is an entire day comprising multiple segments with each showing the average usage. The segment at which peak traffic occurred on the component may then be selected. One selection method involves selecting from the traffic data the peak average use of two consecutive segments; this gives the switch component's busy hour (or other time period) if the segments are 30 minute time periods.

Traffic data measurements for the selected peak hour are stored for each day in the database. The traffic data can be automatically filtered to eliminate aberrant data, i.e., data that embodies errors or that should be excluded from traffic sage engineering analysis because it falls outside of statistically acceptable bounds. Then, the processor averages the non-flagged traffic data in order to determine the average usage of a particular component at its busy hour.

This selection of a peak segment and determination of average usage during the peak segment may be performed daily upon the segments recorded in the journal, which is updated routinely so as to keep only the segments describing traffic over the most recent selected number of days. Because the process selects the average peak usage segment over a rolling, updated journal, changes in traffic patterns for particular switch components or switches during that time period will be dynamically and automatically detected. Generally, by the time the shift in peak usage has repeated for one-half of the journalling period, the data indicating a new average peak usage segment overcomes data supporting the old average peak usage segment. For example, if particular switch components have been handling traffic from a prison that allows inmates to make calls during the 5:00 p.m. to 6:00 p.m. period, that period likely will be the average peak segment. However, if prison officials permanently change the calling time to 7:00 p.m. to 8:00 p.m., the average peak segment would shift to this later period. Assuming a journalling period of 30 days, the present process would detect the shift within about 15 days. Accordingly, a temporary change of less than 15 days would not change the average peak segment.

Using data collected as described above, methods of the present invention may be used to more accurately determine capacity of individual switch components. First, non-representative traffic measurements for a particular component's average peak usage segment are identified and removed from the data from which capacity is determined. Next, the method uses the remaining traffic data to determine an average traffic usage limit for the switch component.

In order to accurately determine which measurements truly are non-representative, the method of the invention selects a first mean value for all traffic data measurements at a selected average peak usage segment for a particular journalling period. Thus, if a component has a 2:30–3:30 p.m. average peak usage segment, the mean of the traffic at this time is determined for the prior 30 day journalling period. Next, a lower bound is established. The present invention selects the lower bound as a percentage of the first mean value. Preferably, 95% of the first mean value is used as the lower bound. This value has been found to exclude traffic measurements from low usage days not representative of normal, predominant traffic patterns. Relevant measurements remain to allow proper engineering of the component.

Next, an upper bound is established. This is done by determining a second mean value based upon traffic data for the journal (e.g., prior 30 days) that remains after traffic below the lower bound (e.g., 95% of the first mean) is excluded. The method then determines the standard deviation between the second mean and traffic data remaining above the lower bound. An upper bound can then be established based on the second mean plus 2 standard deviations. All daily peak usage segment measurements exceeding the upper bound are excluded.

By marking non-representative measurements in accordance with this method, the present invention more accurately eliminates actual non-representative traffic data, by contrast with prior methods, which simply made gross assumptions about which data was likely to be non-representative. Moreover, the method of the present invention detects changes in traffic patterns that create non-representative data. For example, while prior methods would not detect a snow day or the like during which traffic was particularly high, the present method detects and excludes such unrepresentative data.

With the data bounded by the lower and upper bounds, a third mean value that represents the average monthly traffic usage for the switch component may be determined. This third mean value is used as the average measurement of actual usage for engineering purposes. This value is compared against calculated usage capacity to determine proximity to service limits. It is also used in calculations of average usage per assigned line on the component, which can be used to estimate the number of individual subscribers that can be supported by the component. The usage measurements remaining after the above exclusion process can be used to compute a measurement of volatility exhibited by the data. This volatility measures is computed by the standard deviation of the usage measurement divided by the mean. The volatility measurement can be used to then compute the average usage capacity of the component.

A database stores the average usage for a busy hour as well as the traffic usage limit calculated for the switch components. Such traffic data may include busy hour usage, call attempts or call blocking. The average usage traffic data may then be compared to the component's threshold capacities in order to manage the load on the component. Components that are at, near or over capacity can have their loads appropriately adjusted. An administration network may be provided that can access the stored traffic data and generate reports in order to determine whether objective service levels are being met by the communications network. For instance, various network managers may connect to a network information warehouse holding the collected traffic data for the selected average peak segments of various switch components. Network managers may then run reports to obtain service level measurements, like determinations of a particular component's (or switch's): percent dial tone delay; percent capacity; percent occupancy; percent blocking or any other measurements desired by network engineering.

The process of the present invention may be implemented on a computer platform in communication with a particular or numerous switches. For instance, in one embodiment, a personal computer may be coupled to selected switch components. In another embodiment, a warehouse computer platform may be coupled to a collector that polls multiple components of multiple switches in order to collect traffic data describing traffic handled by those switch components. For instance, the warehouse platform may couple to the collector that monitors traffic across switches located within a regional communications network, such as a Local Access and Transport Area ("LATA"), or multiple switches in regional networks. The warehouse platform stores collected traffic data and processes it as described above in order to select the average peak usage segment for a particular switch component.

The present invention accordingly aims to achieve at least one, more or combinations of the following objectives:

To accurately calculate the operating capacity of individual switch components in order to assign the correct number of lines to particular components.

To automatically select an average peak usage segment useful for allocating resources within a communications network and thereby make more efficient use of network resources and decrease network operating costs;

To collect and analyze traffic data from switch components in order to select the average peak usage segment of at least selected switch components;

To dynamically determine shifts in a particular component's average peak usage segment;

To monitor traffic across selected switch components during that component's selected average peak-usage segment and compare traffic at that time to the component's capacity in order to adjust loads across selected switch components;

To support traffic engineering by analyzing traffic data collected during switch components' average peak usage segments in order to generate various reports on switch components' service levels;

To provide methods for eliminating non-representative traffic measurements for switch component engineering;

To more accurately determine limiting average traffic for switch components; and To provide a system for implementing the methods of the present invention that achieve the above objectives.

Other objects, features and advantages of this invention will become apparent from the rest of this document, including the Figures.

DETAILED DESCRIPTION OF THE DRAWINGS

Overview of a Communications Network

Figure 1A:
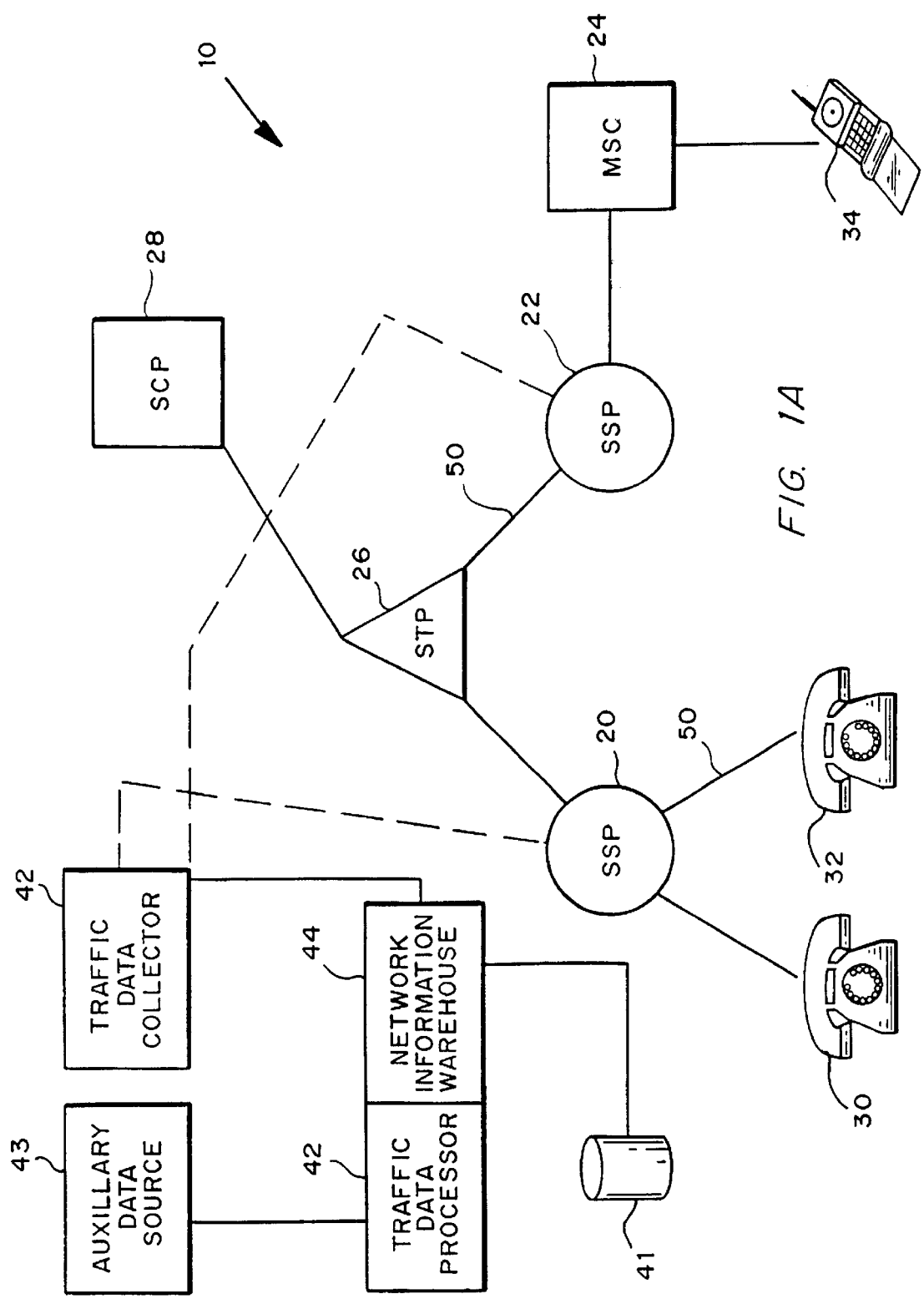
FIG. 1A shows a system according to the present invention for processing traffic data collected from a representative communications network.

FIG. 1A shows a communications network 10, which in the embodiment shown is a telecommunications network provided with Advanced Intelligent Network ("AIN") and Signaling System 7 ("SS7") capabilities. Network 10 illustrates one type of network with which the present invention operates. Network 10 has service switching points ("SSPs") 20, 22 and a signal transfer point ("STP") 26, which also couples toe* a mobile switching center ("MSC") 24. SSPs 20, 22 can be any telecommunications switch, such as a 1AESS, 5ESS, DMS-100/200, EWS2, DC0, DMS10 or comparable switches (including packet switches). Service control point ("SCP") 28 couples to the STP 26 (as well as other STPs not shown in FIG. 1A).

By way of example, any of phones 30, 32 may originate a call through SSP 20 by dialing a terminating number to, for instance, wireless phone 34. Originating SSP 20 launches a query containing the dialed destination digits; the query is switched through the SS7 network 10 via STP 26 to a SCP 28 that comprises routing and customer feature databases. SCP 28 provides a route by which the call from phone 30, 32 can travel to wireless phone 34. One such routing may be from originating SSP 20 through tandem SSP 22, which, in turn, terminates the communication to MSC 24. MSC 24 communicates with wireless phone 34 through well-known base stations located at various cell sites.

Collecting Traffic Data from Switch Components

Network 10 also includes a traffic data collector 40, traffic data processor 42 and: network information warehouse ("NIW") 44, which has a database 41. Collector 40 can be a TDMS ("Traffic Data Monitoring System"), sold by Lucent Technologies (formerly AT&T) or a DCOS 200, sold by Bell Communications Research (also called "BellCore"), deployed, for instance, on a UNIX 3B21600 platform. Collector 40 couples to the SSPs 20, 22, which it periodically polls for buffered traffic data.

Generally, switch manufacturers have standardized SSPs 20, 22 to measure and then buffer traffic data every 30 minutes, although SSPs 20, 22 could be modified to measure traffic data more or less frequently. These unprocessed traffic data measurements include measurements on a component level of total usage, maintenance usage, terminating calls and terminating concentrator calls. Total usage measures, usually in hundred call seconds ("CCS"), the time the component is in use during the segment. Total usage includes regular use (e.g., by customers) and maintenance usage, which measures the time the component is unavailable to handle regular customer traffic. Terminating calls refers to the number of calls terminated to the line unit ("LU") (or if a 3-way LU, the number of 3-way calls handled by that component). Terminating concentrator calls are the number of failed events occurring because all equipment was in use (e.g., blocked calls). Link data may also be measured, or, if the component is a switch processor, its usage level may similarly be measured. (In other words, traffic data includes measurements of the use of switch processors).

Collector 40 provides a traffic data stream to the processor 42 and NIW 44. (Alternatively, for older networks 10, collector 40 may provide its traffic data stream first to a network data system that supports traffic engineering processor 42 and NIW 44 may then obtain traffic data from the network data system). Collector 40 and processor 42 can be deployed on various separate or single computer platforms. For example, a personal computer or work station platform can host both the processor 42 and NIW 44 in order to collect and process traffic data from selected components of multiple SSPs 20 or 22. Alternatively, processor 42 and NIW 44 can be deployed on a warehouse platform such as an NCR 5100 Unix-based server running the Teradata Relational DBMS and sold by NCR.

Database 41 may include traffic data records collected by collector 40 and including: (1) detailed traffic data for each monitored switch component for the most recent 90 days (or longer) and (2) historical summary data in the form of a journal of the average busy hour for each of the most recent 30 days used to determine the rolling 30 day average and historical data showing snapshots of daily summary data for the first of each month for a selected time period (e.g., 3 years). Database 41 also maintains various descriptor and reference files. Additionally, various auxiliary sources 45 of data may couple to NIW 44 and provide various types of information to database 41 in order to assist in traffic engineering functions. For example, switch cross-reference tables (to help correlate switch location codes that differ among administrative systems), traffic tables (Poisson distribution tables used in determining component capacities), ODF (Office Data File with manual configuration or working line data), SCM (Switch Capacity Manager who is the traffic engineer and the network planner), LSD&F (Line Switch Demand and Facility, which is a planning system), MR7 (Management Report 7 that produces statistical monthly reports counting working quantities of customers using certain switch features), LNA (Line and Number Administration that assigns lines and carrier systems on switches) or COSMOS (a system that mechanically assigns lines to line units) data may be provided. These auxiliary sources 45 generally describe characteristics of SSPs 20, 22 or their components.

Figure 1B:
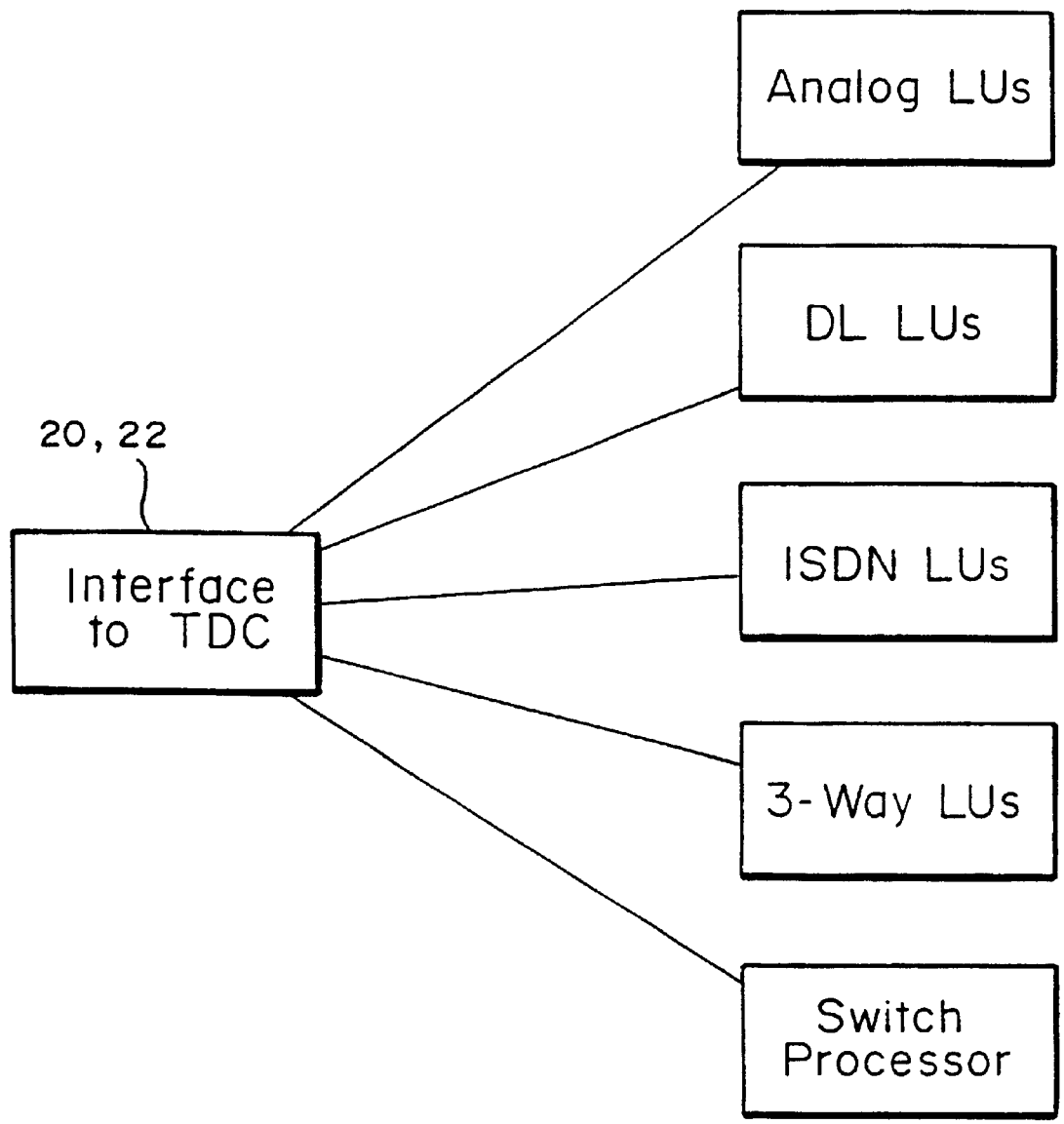
FIG. 1B shows the components of a switch from which traffic data is collected and processed via the system shown in FIG. 1A.

FIG. 1B shows a detailed view of a particular SSP 20, 22. Generally, regardless of the manufacturer or type of SSP 20, 22, each will have at least the following components from which the collector 40 obtains traffic data: (1) line units that terminate-Copper lines (Analog LUs); (2) line units that terminate integrated digital loop carrier lines (DL LUs); (3) line units that terminate ISDN ("Integrated Services Digital Network") lines (ISDN LUs); (4) 3-way conference call or bridging line units (3-Way LUs); and (5) switch processors that run various switch software processes and which the present invention likewise monitors to determine if the processor is over-burdened and needs an upgrade (Switch Processors). FIG. 1B shows that each of these components interfaces to collector 40, which periodically retrieves buffered traffic data. Different switch vendors may provide operator service or other switch components from which traffic data can be collected if desired. Also, as new technologies are deployed within the network 10, SSPs 20, 22 are upgraded to handle the physical line connections required by those technologies. For example, if ADSLI becomes a viable technology option, SSPs 20, 22 will be fitted with components to handle customers having those particular types of lines and traffic data may be collected and analyzed from those ADSL line units in accordance with this invention.

Generally, traffic data is periodically collected throughout an entire 24 hours (or other time period). A "segment" refers to a single traffic data measurement of a single switch or switch component taken during a selected time period, typically, every 30 minutes. The collector 42 takes enough segments to describe the traffic handled by the particular switch component for a working day—which can be an entire 24-hour period or a shorter period (e.g., like the 12 or 18 most active hours of the day).

Figure 3:
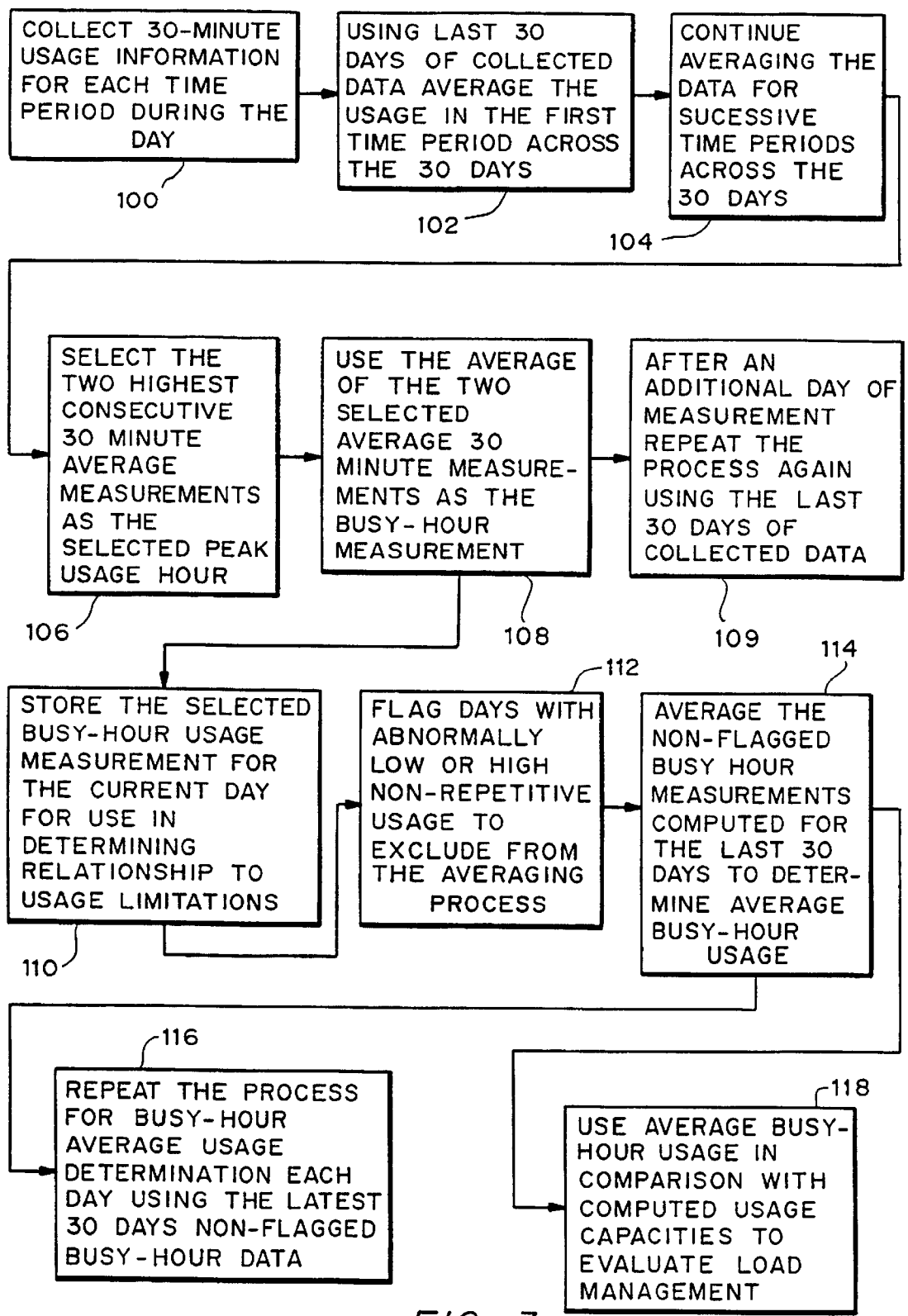
FIG. 3 is a flow chart illustrating the steps for collecting and processing traffic data according to the method of the present invention.

FIG. 3 is a flow chart that shows the steps involved in collecting and processing traffic data from one or multiple switch components. Step 100 begins the process by having the switch component generate and buffer usage information for 30-minute (or other) time periods through the day. Collector 40 retrieves this buffered data. This may involve collector 40 determining at step 102 from which components of SSP 20, 22 traffic data is to be collected. Alternatively, collector 40 can be configured to collect traffic data from a pre-selected set of switch components. For example, collector 40 may periodically poll SSPs 20, 22 to obtain data from each of the components shown in FIG. 1B.

Filtering and Processing Traffic Data

Figure 2A:
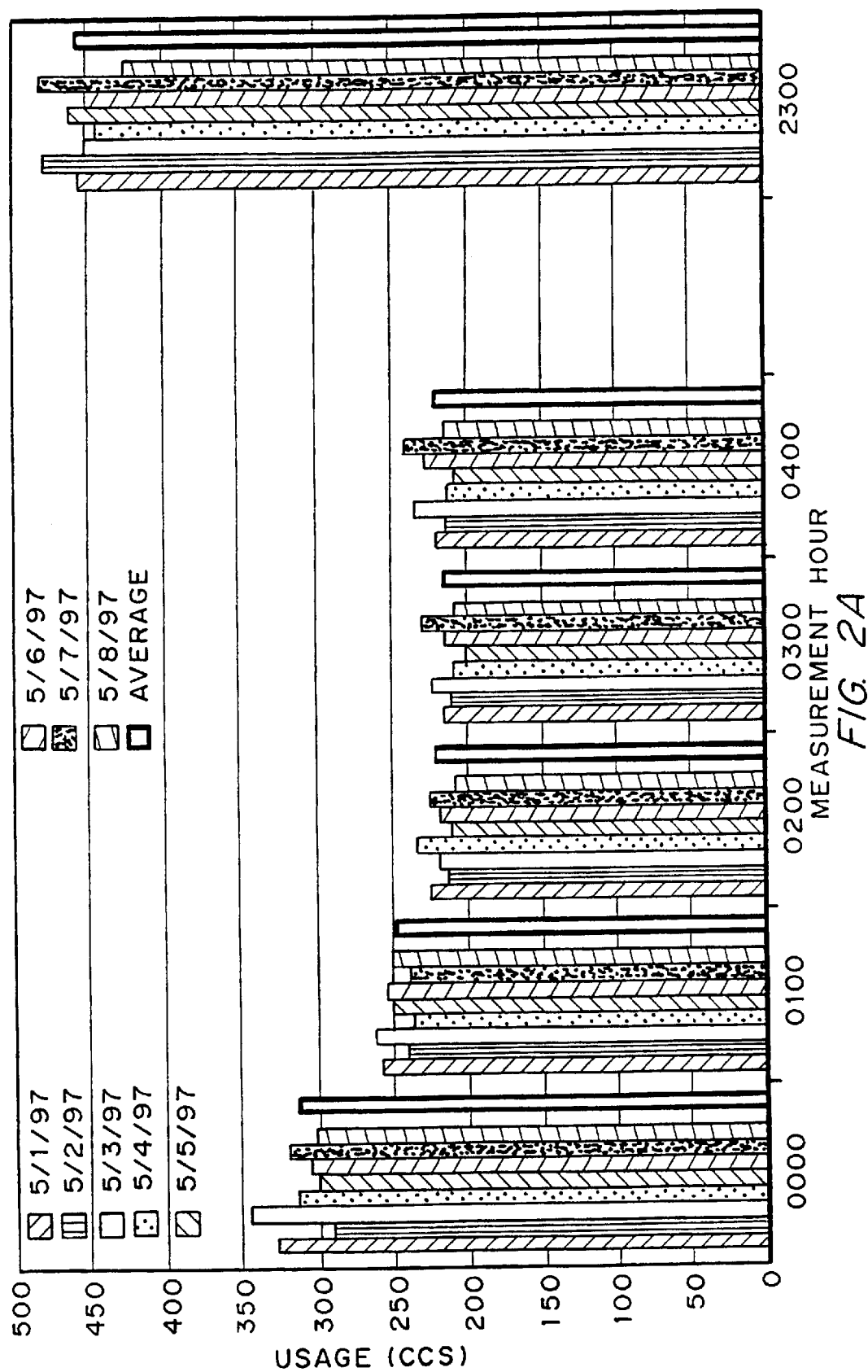
FIG. 2A shows traffic data collected for various segments over multiple days and averaged.

Step 102 averages the last 30 days of collected data in the first time period. Step 104 repeats step 102 for each successive time period across the entire 30 days until all of the traffic data for each time period has been averaged. FIG. 2A shows representative sets of segment traffic data collected from a selected switch component over several days and averaged. The present invention may be configured so that the collector 42 collects similar traffic data from each component of each SSP 20, 22 within network 10.

Figure 2B:
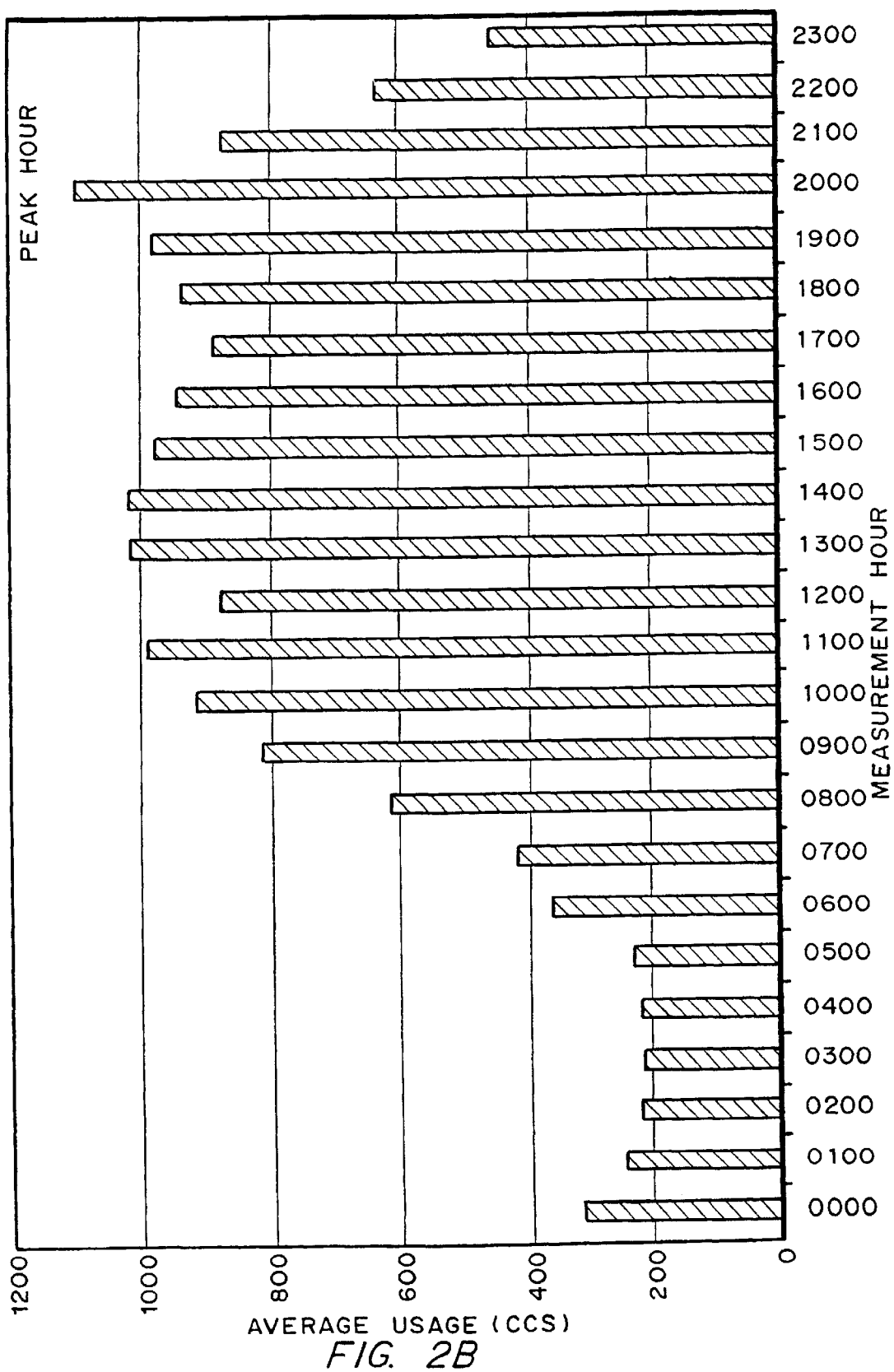
FIG. 2B shows a collection of averaged segments of FIG. 2A that each reflect the average peak traffic for each segment of an entire day.

Step 104 results in a number of average component usages for each time slot, as shown in FIG. 2B. Step 106 then selects from the averaged traffic data the 2 highest consecutive 30 minute average measurements (e.g., time 2000). This is the selected peak usage segment or "busy" hour, as step 108 indicates.

Figure 2C:
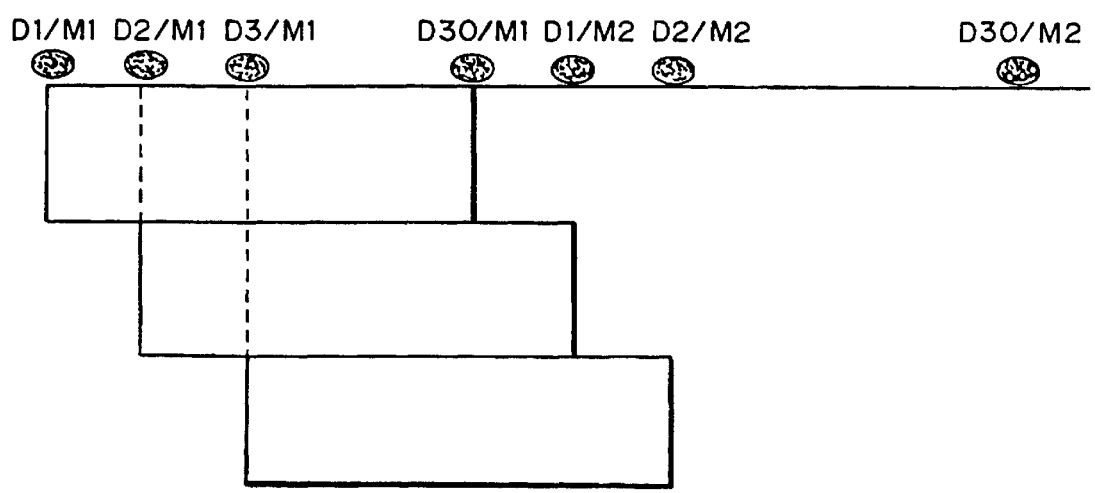
FIG. 2C shows the process of updating a journal to create a moving window whose contents reflect the most recent 30 days worth of averaged traffic data.

Step 109 waits for an additional day of measurements and then automatically repeats steps 100 through 108 using the last 30 days of collected data. Thus, a journal of the 30 most current days is continuously maintained, as shown in FIG. 2C.

After selection of a particular busy hour, step 110 stores the traffic data for that busy hour. Such data, stored by processor 40 in database 41, may be used to determine usage limitations.

Step 112 effectively filters the stored usage data by flagging days with abnormally high or low and non-repetitive usages. That data is excluded from the averaging process. For example, the segments collected over 24 hours may be filtered to remove data describing the highest single instantaneous peak segment for a particular component or switch. Thus, the segment for day May, 18, 1997, time 2300 shown in FIG. 2A would be deleted from the traffic data. Alternatively, improved processes described below and in FIGS. 4–6 may be used to filter data. All of this filtering removes non-repetitive peaks so that they do not adversely effect determination of an average peak segment for a selected journalling period.

FIG. 3 shows that step 114 averages the non-flagged busy hour measurements recorded for the last 30 days to determine the component average usage during the busy hour. Step 116 repeats the process for determining a switch component's busy hour average usage by using the latest 30 days of non-flagged busy-hour data. Step 118 uses the average usage of the component in the busy hour to compare with thresholds, like the component's computed usage capacity, that describe the component's capacity. Such comparisons are used for load management.

Network Traffic Engineering

Figure 4:
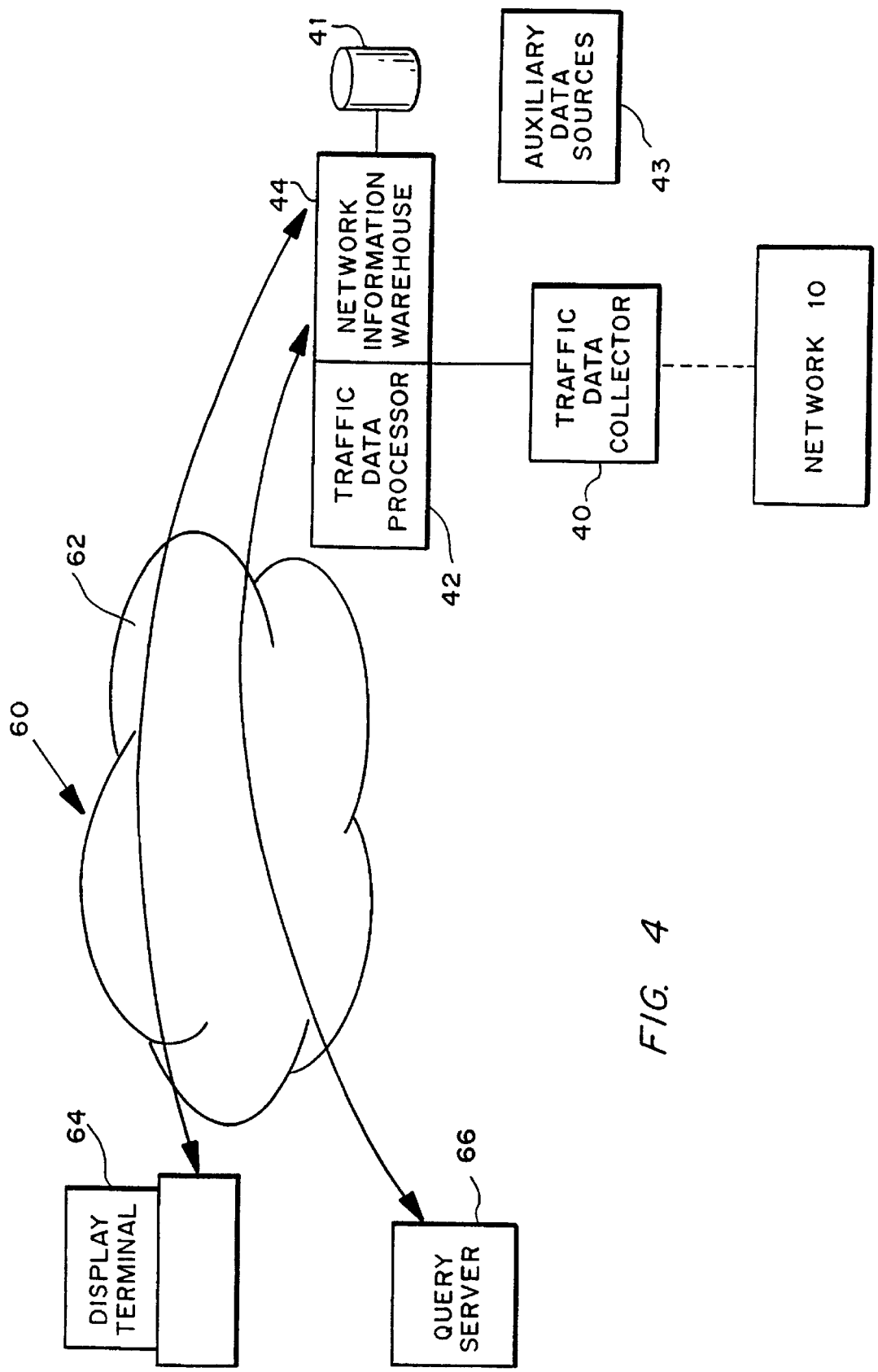
FIG. 4 shows a traffic engineering system for monitoring the load on switch components during their selected average peak segments, comparing the actual load to thresholds and reconfiguring the network to optimize switch component use.

FIG. 4 shows a traffic engineering system 60 for monitoring and adjusting loads upon the components of SSPs 20, 22 within a network 10 and based upon selection of the average peak segment for each component of SSPs 20, 22. Generally, traffic engineering system 60 aims to (1) monitor the load on each component during the average peak segment selected according to this invention; (2) compare the actual load determined from such monitoring with a threshold that is the determined or pre-selected capacity of that component; and (3) alert network engineers to particular components' under- or over-utilization so that the network 10 can be more optimally configured. Processor 42 (or a separate monitoring processor) may couple to database 41 and NIW 44 to perform these functions.

Processor 42 generally performs the following steps in order to determine whether particular switch components are under- or over-utilized. First, the average peak usage segment or average peak busy hour is selected for the component, as described above. Processor 42 ensures that traffic data describing component usage during that time period is collected and stored in database 41. Processor 42 determines the average usage of switch components at that average peak segment in accordance with the methods described above. Next, processor 42 identifies the particular component's theoretical load using Poisson tables and calculations. (Telephone traffic is often assumed to have Poisson arrival and exponential holding times, allowing the theoretical load to be calculated using the cumulative Poisson distribution function). Theoretical load must be adjusted to an operating load that ensures the component does not block an unacceptable percentage of calls. Network Information Warehouse ("NIW") 44 stores and manages the enormous amount of data needed to determine average peak load and theoretical load of the many components of multiple SSPs 20, 22 within network 10.

Percentage capacity of the component may then be determined by the processor 42 comparing the average peak load at the average peak busy hour with the operating load. Capacity is then compared to thresholds within database 41. If capacity is at, near or above the threshold, processor 42 may flag the component as potentially over-loaded. Processor 42 may also flag under-loaded components.

Display/Terminal 64 and query server 66 allow network 10 traffic managers to run queries and reports against NIW 44 data. Queries may be launched through an administration network 62, which can be a wide area network providing intranet connections within a carrier's region. A single or multiple display/terminals 64 allow for report submission and viewing, ad hoc queries, and descriptor and reference file maintenance. Query server 66 schedules reports and also allows for report viewing and printing.

A. Removal of Unrepresentative Data

An additional benefit of the present invention involves the ability dynamically to flag and remove from further analysis traffic data that is not representative of typical traffic handled by a particular switch component. This process removes unrepresentative traffic data while also accounting for the overall traffic volatility that a particular switch component handles.

Figure 5:
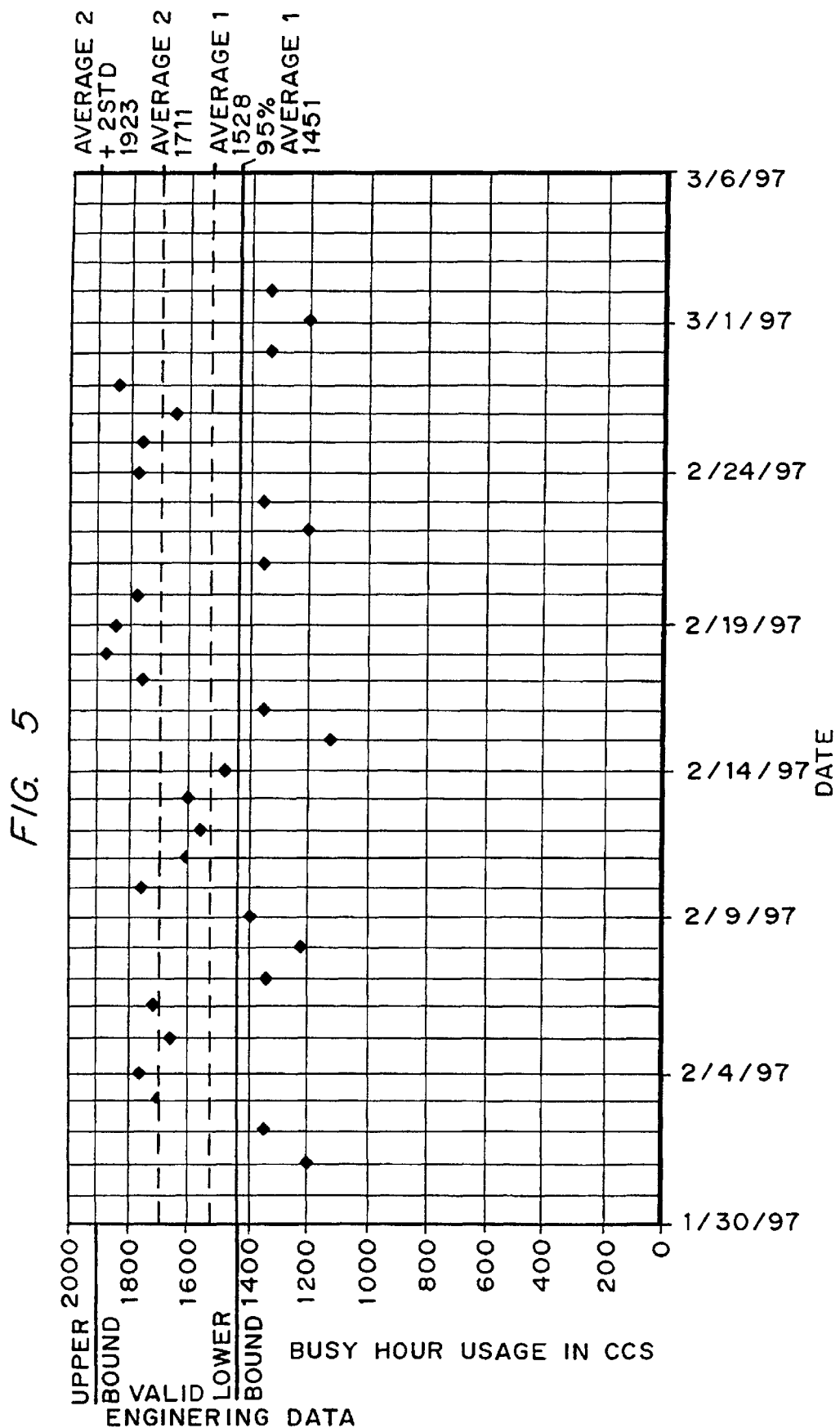
FIG. 5 shows traffic data for a particular component and a method for flagging aberrant data.

FIG. 5 shows a sampling of traffic data representing the CCS handled by a particular Line Unit on SSP 20 during the average peak usage segment on a particular day. The method of the present invention establishes an upper bound 50 and a lower bound 52, within which bounds 50, 52 are representative traffic data and outside of which are non-representative traffic data. Traffic data is collected for a selected journalling period, usually 30 days, but FIG. 5 shows data collected over an approximately 5 month period. A first mean value 54 is determined based on all of the traffic data collected for the journalling period. A lower bound 52 is selected that is less than, but based upon, the first mean value 54. For example, a lower bound 52 may be established as 95% of the first mean value 54. Daily traffic data that falls below the first mean value 54 is eliminated from the journal. A second mean value is calculated based upon the remaining, first filtered journal data. The method then determines a standard deviation between the filtered journal traffic data and the second mean value 56. An upper bound 50 may then be set based upon the second mean value 56 and data exceeding the upper bound discarded to create a twice-filtered journal. For instance, an upper bound 50 that equals the second mean value 56 plus two standard deviations has been found helpful in eliminating overly-volatile traffic data, while keeping the representative data.

By selecting the lower bound 52 to be just under the first mean value 54 while selecting the upper bound 50 to be substantially more than the second mean value 56, traffic data for particularly low traffic days is eliminated from calculations of switch component's average peak loads while many of the high traffic data days, but not days that are unusually high, are kept. This method ensures elimination of low traffic data that would otherwise suggest to network engineers that the switch component could handle more traffic. At the same time, except for exceptionally-volatile high traffic data, most data is kept and analyzed in order to engineer properly the switch component to handle high loads.

B. Calculating Operating Point Usage

As described in AT&T Practice No. 235-070-100, Issue 10 (November, 1995), analog LUs terminate switched, analog subscribers and transform their signals into digital signals understood by SSP 20 and the rest of the network. Analog LUs service multiple lines, ranging from 256 to 640 lines; however, only 64 time slots are available for the LU. Thus, LUs are said to have line concentration ratios of 4:1 (256/64), 6:1 (384/64), 8:1 (512/64) or 10:1 (640/64). Prior processes do not calculate the capacity of each component (e.g., of each analog LU). Instead, operating capacities were calculated for an entire central office SSP 20, based upon the average busy hour for the entire SSP 20 and gross assumptions about which traffic data to flag as aberrant. The present invention accurately determines actual usage capacity or Operating Point Usage ("OP") of each component of SSP 20 using the following formula:

$$OP=\{[1+4*PL*K*CV^2]^{1/2}-1\}/2*K*CV^2$$

The following table describes the values for equation's variables:

---

Figure 6:
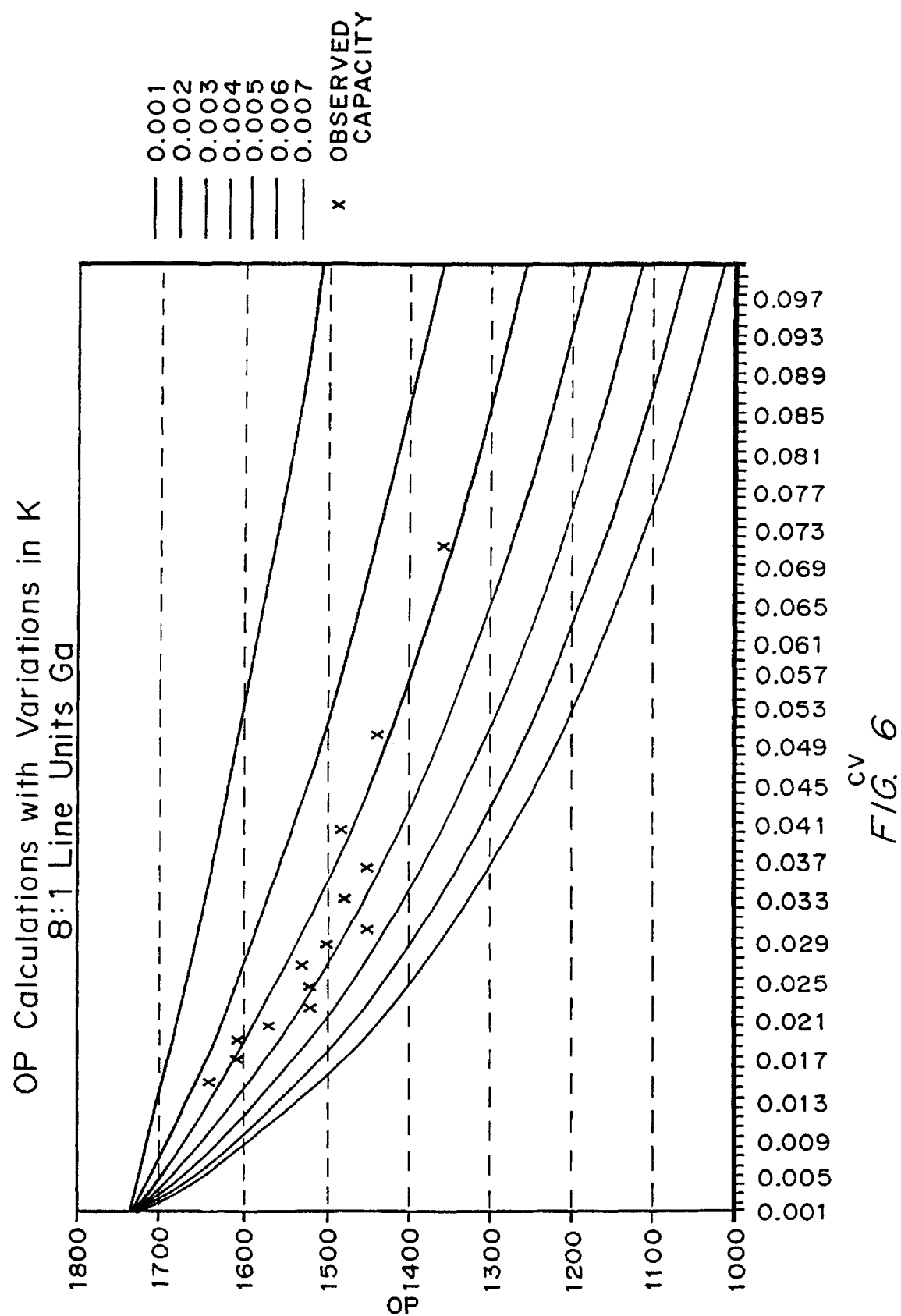
FIG. 6 shows a load service curve illustrating the difference in operating point capacity of a particular switch component for a particular constant.

OP  is the LU's Operating Point Usage (that is, the LU capacity)
PL  is the CCS capacity from the appropriate service load curve (no load
     variation exists, CV = 0.0) based upon the blocking criteria ($B_0$)
     chosen or calculated as described in AT&T Practice No.
     235-0070-100, Issue 10.00 (Nov. 1995). In other words, it is the
     theoretical load capacity that is derived from Poisson tables, such as
     those set forth in AT&T Practice No. 235-060-110,
     Issue 7.00 (Feb. 1993).
K   is a constant empirically derived from the appropriate load service
     curve, as shown in FIG. 6, which plots Operating Point (in CCS)
     versus the CV or coefficient variation.
CV  is the coefficient variation for the day-to-day data. The sample size
     for which the coefficient of variation is calculated is
     a user-defined one.

---

In order accurately to calculate the operating point capacity of each LU or other switch component, the system must determine a coefficient of variation ("CV") that characterizes the variations in traffic load that a particular LU or other switch component realizes during a selected average peak segment. Basically, CV measures the volatility of the data around a selected average. The formula for CV is:

CV=standard deviation/average=s/average
Where:

$$s = \text{Square Root}\left\{\sum_{i=1}^{n}(X_i - \text{average})^2 / (n-1)\right\}$$

$$\text{average} = \sum_{i=1}^{n} X_i/n, \quad n = \text{the total number of } LU \text{ averages in one month}$$

$X_i$ is the busy hour total usage for the $LU$ for the $i^{th}$ day

Figure 7:
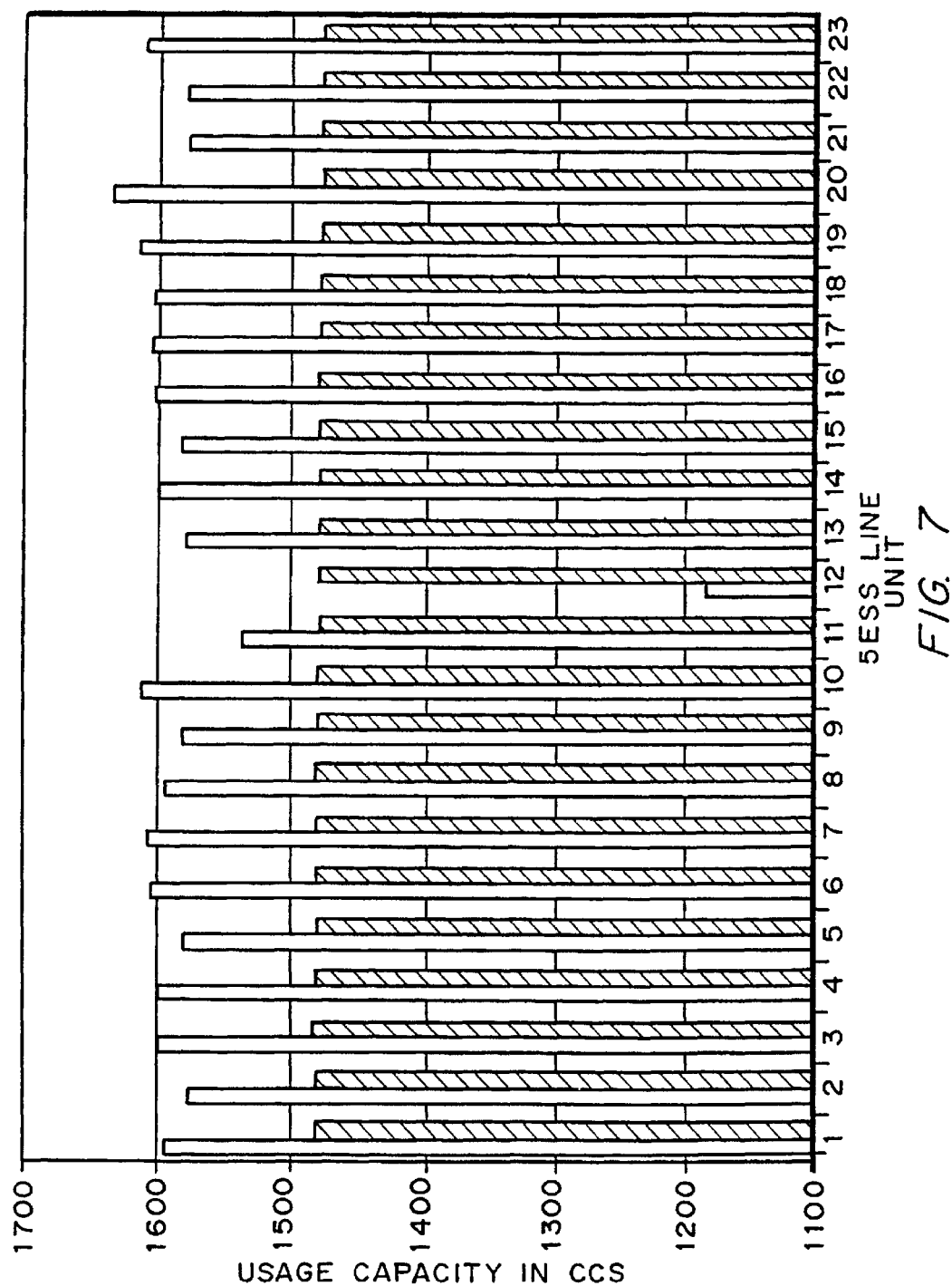
FIG. 7 is a bar graph comparing (a) operating point capacity determined according to prior processes and only based upon overall switch capacity and (b) operating point capacity determined according to the processes of the present invention and on a per switch component basis.

FIG. 7 shows a comparison between usage determinations according to prior processes and usage determinations made using the methods of the invention. Prior processes simply determined an overall CV for the entire SSP 20 and then used that to determine the average usage capacity (in CCS) for each component in the SSP 20. By contrast, the present invention calculates a CV for each component of SSP 20 and then determines each component's actual usage limit. By way of example, SSP 20 may be a 5ESS switch provided by Lucent Technologies with at least 23 Line Units (LUs). FIG. 6 compares the actual usage capacity of each LU that the method of the present invention determines against the usage capacity using prior processes. FIG. 6 illustrates that if prior processes are used, LUs 1–11 and 13–23 will each be over-engineered; in other words, each of LUs 1–11, 13–23 have capacity to handle more calls. LU 12, however, has been under-engineered and cannot keep up with the traffic assigned to it. This under-engineering would create quality service problems that would be expensive or impossible to diagnose using prior methods.

Note that although these methods are described for use in determining traffic usage across analog LUs, they can and should be readily useable for other types of switch components.

By way of example, assume that the present invention monitors component 12 of SSP20. If component 12 were engineered to handle mostly residential traffic, the method illustrated in FIG. 3 would determine that an average peak usage segment for component 12 occurred at 1900 hours, as shown in FIG. 2B. FIG. 4 could represent the processing of all traffic data for component 12 collected during average peak usage hour 1900 over a selected period. The method described above is used to flag unrepresentative measurements and determine the actual average usage capacity for component 12. If component 12 had been engineered for the traffic load determined according to prior methods (as also shown in FIG. 6), system 60 would have instead determined that component 12 was under-engineered for its given traffic flow.

Persons skilled in this art will recognize that the present invention may be used with various types of communication networks in addition to network 10. Such persons will also recognize the configuration and method of operation of the particular, illustrative network 10 shown in FIG. 1. Similarly, skilled persons will recognize that the methods of the present invention may be applied to other network elements, like STPs or packet switches, for which similar traffic data may be collected. Additionally, the type of traffic data collected from such network elements may include the traffic data discussed herein or other data such as the traffic data described in tables set forth in U.S. Pat. Nos. 5,359,649 and 5,333,183, each of which are hereby incorporated in their entirety by this reference.

The foregoing is provided for purposes of illustrating, explaining and describing several embodiments of the present invention. Modifications and adaptations to these embodiments will be apparent to those of ordinary skill in the art and may be made without departing from the scope or spirit of the invention and the following claims. For instance, the illustrative time periods, switches or networks described in this document in no way limit the scope of the below claims as persons skilled in this art recognize that the present invention can be easily modified for use with interchangeable time periods, switches or networks.

What is claimed is:

1. A system for mechanically managing communications traffic by automatically and dynamically selecting a time period during which a network element for a communications network handles peak communications traffic and analyzing the amount of traffic handled by the network element, the system comprising:

a) a collector for periodically recording traffic data comprising information about the communications traffic passing through the network element;

b) a database for receiving and storing recorded traffic data;

b) means, coupled to the database, for selecting from the traffic data a first busy hour that describes the average peak usage of the network element;

c) means for updating the traffic data in the database in order to automatically detect a shift in average peak usage of the network element to a second busy hour.

2. The system of claim 1 further comprising means for filtering the traffic data to remove traffic data that does not conform to acceptable, pre-selected parameters.

3. The system of claim 1 in which the network element comprises a component of a switch selected from the group consisting of analog line units, digital loop line units, 3-way call line units, switch processors and ISDN line units.

4. The system of claim 1 further comprising an administration network for determining an operational capacity of the switch component and comparing the operational capacity with the traffic handled by the switch component during the average peak usage time period.

5. The system of claim 4 further comprising means for determining the actual load on each of the selected components during their respective average peak usage segments.

6. A communications network comprising:
   a) a plurality of network elements, each with multiple components adapted to generate traffic data describing traffic handled by each of the selected components for a preset segment of time;
   b) means, coupled to the switches, for periodically collecting traffic data from selected components of each network element;
   c) means for receiving and storing from the collecting means sufficient traffic data to create a journal that describes traffic handled by the selected components over a selected period of days; and
   d) means for automatically and dynamically selecting a segment describing the average peak usage of each of the selected components.

7. The system of claim 6 further comprising means, coupled to the selecting means, for determining an operational capacity of each switch component and comparing the operational capacity of each switch component with the actual load.

8. The system of claim 6 further comprising a plurality of data sources, coupled to the receiving and storing means, for providing data describing characteristics of the network elements and the components.

9. A method for determining the capacity of a selected component of a switch used in a communications network, the component having a selected average peak usage time segment for which traffic data are collected and stored in a data base to create a multi-day journal of traffic measurements, the method comprising the steps of
   a. identifying traffic data that is representative of communications traffic handled by the component; and
   b. determining an average traffic usage limit for the particular component from the representative traffic data.

10. The method according to claim 9 in which the average traffic usage limit is the mean value of the representative traffic data.

11. The method according to claim 9 in which the identifying step comprises the steps of eliminating from the data base (i) traffic data describing particularly low traffic periods and (ii) eliminating traffic data describing unusually high traffic periods.

12. The method according to claim 9 in which the determining step comprises the step of calculating the operating capacity for the selected component at the average peak usage segment with the use of a coefficient of variation.

13. A method for determining the capacity of a selected component of a switch used in a communications network, the component having a selected average peak usage time segment for which traffic data are collected and stored in a data base to create a multi-day journal of traffic data, the method comprising the steps of:
   a. establishing a lower bound and a upper bound;
   b. determining the standard deviation of the traffic data falling within the upper and lower bounds;
   c. identifying traffic data that is representative of communications traffic handled by the component by creating a subset of traffic data including data (i) falling above the lower bound and (ii) falling under at least one standard deviation above the upper bound; and
   d. determining an average traffic usage limit for the particular component from the representative traffic data.

14. The method according to claim 13 in which the lower bound is based upon a percentage of a first mean value determined from all the traffic data relating to the usage of the component during the average peak usage segment.

15. The method according to claim 13 in which the upper bound is based upon a second mean value determined from the traffic data remaining after exclusion of any traffic data falling below the lower bound.

16. The method according to claim 13 in which the determining step comprises the step of calculating the operating capacity for the selected component at the average peak usage segment with the use of a coefficient of variation.

17. The method according to claim 13 in which the upper bound is based upon a percentage of a first mean value determined from all the traffic data relating to the usage of the component during the average peak usage segment.

18. The method according to claim 13 in which the average traffic usage limit is the mean value of the representative traffic data.

* * * * *